(12) United States Patent  
Maher (10) Patent No.: US 12,194,909 B2
(45) Date of Patent: Jan. 14, 2025

(54) MONITORING SYSTEM DESIGNED TO EXTRACT CRITICAL NATURAL FREQUENCIES OF A CARGO SHIP

(71) Applicant: Trendsetter Vulcan Offshore, Inc., Houston, TX (US)

(72) Inventor: James V. Maher, Houston, TX (US)

(73) Assignee: Trendsetter Vulcan Offshore, Inc., Houston, TX (US)

( * ) Notice: Subject to any disclaimer, the term of this patent is extended or adjusted under 35 U.S.C. 154(b) by 304 days.

(21) Appl. No.: 18/049,249

(22) Filed: Oct. 24, 2022

(65) Prior Publication Data

US 2023/0132289 A1 Apr. 27, 2023

Related U.S. Application Data

(60) Provisional application No. 63/271,430, filed on Oct. 25, 2021.

(51) Int. Cl.
*G01L 5/04* (2006.01)
*B60P 7/08* (2006.01)
(Continued)

(52) U.S. Cl.
CPC .......... *B60P 7/0861* (2013.01); *G01L 5/047* (2013.01); *G01L 5/105* (2013.01); *G08B 21/182* (2013.01)

(58) Field of Classification Search
CPC .......... G01M 5/0025; G01M 5/0033; G01M 5/0066; G01L 5/047; G01L 5/103; B60P 7/0861
See application file for complete search history.

(56) References Cited

U.S. PATENT DOCUMENTS 8,847,758 B2  9/2014  Eide
10,328,842 B2  6/2019  McNally
(Continued)

FOREIGN PATENT DOCUMENTS

DK    201870089 A1    9/2019
ES    2932976 T3 *    1/2023    ............ B60P 7/0861
(Continued)

OTHER PUBLICATIONS

DMAIB, "Marine Accident Report on Maersk Essen's Loss of Cargo on Jan. 16, 2021," Feb. 28, 2022, Denmark.
(Continued)

*Primary Examiner* — Andre J Allen
(74) *Attorney, Agent, or Firm* — Porter Hedges LLP; Pierre Campanac; Jonathan Pierce (57) ABSTRACT

A system includes several load cells, each coupled to a lashing that secures shipping containers, accelerometer cells, each coupled to a shipping container at the top of a stack, and an inclinometer cell coupled to a cargo ship. The cells are configured to transmit data to a computer. All the cells comprise a processor programmed to acquire a time series of measurements and, preferably, decompose the time series into a sum of sinusoidal signals, each having a frequency and an amplitude. Alternatively, the computer can be programmed to decompose the time series. The computer is programmed to identify the signal components caused by the roll of the cargo ship or by resonances in shipping container stacks. The computer estimates cumulated damages caused by fatigue in the lashings and/or twist locks. The system is used to trigger alarms and/or schedule maintenance.

18 Claims, 7 Drawing Sheets

(51) Int. Cl.
    *G01L 5/105*     (2020.01)
    *G01M 5/00*     (2006.01)
    *G08B 21/18*     (2006.01)

(56) References Cited

U.S. PATENT DOCUMENTS

| | | |
|---|---|---|
| 10,961,677 B2 | 3/2021 | Maher et al. |
| 11,235,841 B1 | 2/2022 | Maher et al. |
| 11,312,454 B1 | 4/2022 | Maher et al. |
| 2015/0285795 A1 | 10/2015 | Amit et al. |
| 2017/0267159 A1 | 9/2017 | Bruhn |
| 2018/0328803 A1* | 11/2018 | Hamasaki ............... G01L 5/107 |
| 2020/0264061 A1* | 8/2020 | Jha ........................ G01L 1/246 |
| 2022/0080876 A1* | 3/2022 | Rainone ................. G01L 5/101 |

FOREIGN PATENT DOCUMENTS

| | | | | |
|---|---|---|---|---|
| JP | 2022100744 A | * | 7/2022 | |
| KR | 20210094309 A | * | 7/2021 | |
| WO | WO-2017064449 A1 | * | 4/2017 | |
| WO | WO-2018173391 A1 | * | 9/2018 | ............... G01N 3/08 |
| WO | WO-2022020442 A1 | * | 1/2022 | |

OTHER PUBLICATIONS

Extended European search report issued in counterpart application EP 22203687.3 on Mar. 16, 2023, 8 pages.

\* cited by examiner

MONITORING SYSTEM DESIGNED TO EXTRACT CRITICAL NATURAL FREQUENCIES OF A CARGO SHIP

CROSS-REFERENCE TO RELATED APPLICATIONS

This application claims the benefit of priority to U.S. provisional application Ser. No. 63/271,430 filed on Oct. 25, 2021, which is incorporated herein by reference in its entirety for all and any purposes.

BACKGROUND

This disclosure relates generally to methods and systems for monitoring the dynamics of shipping containers stacked on a cargo ship subjected to waves.

Figure 1:
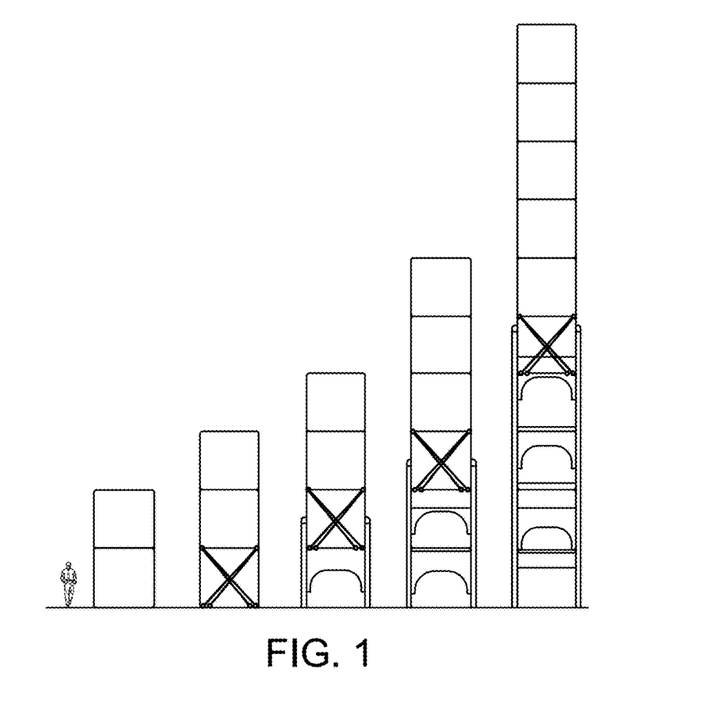
FIG. 1 illustrates the evolution of typical stacks of containers with a typical inboard lashing.

Examples of stacks of containers that are monitored are illustrated in FIG. 1. The original lashing solution was introduced for stacks 3 containers high. Then lashing bridges were added and later increased in height. Current designs are stretching the capabilities of the existing lashing components.

Figure 2:
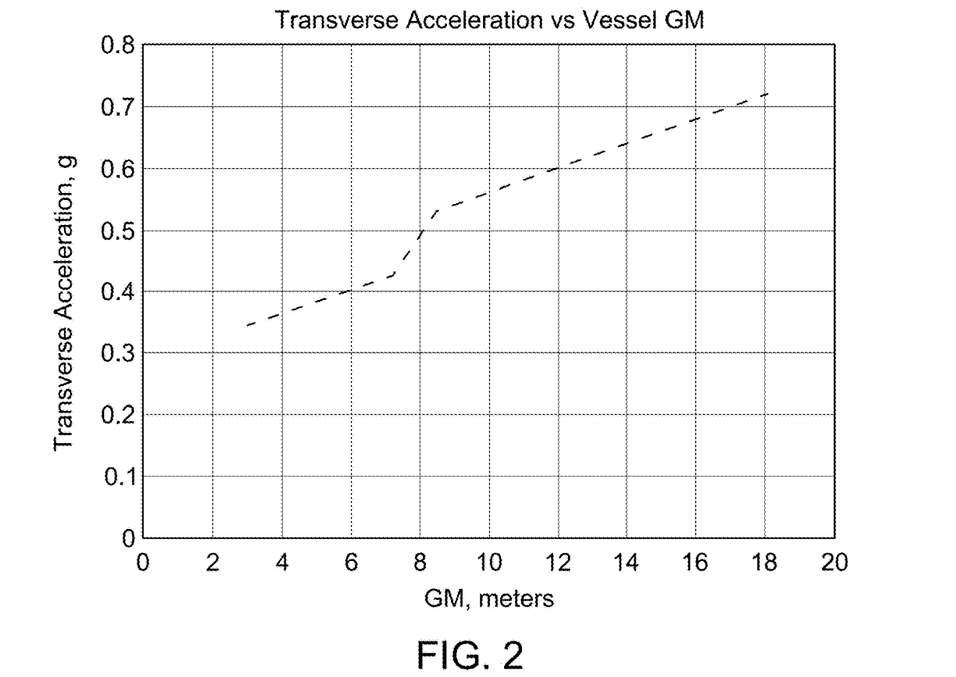
FIG. 2 is a graph of the magnitude of lateral acceleration as a function of GM.

The lashings may now be failing because accelerations (e.g., lateral accelerations) at the top of the stacks are getting higher. For example, as the metacentric height (GM) increases and the height of the stack increases, the lateral acceleration of the containers also increases, as shown in FIG. 2. Increased waterplane on larger vessels increases GM, formerly about 3 meters, now about 10 meters or more. At GM of 8 meters, the roll period of the cargo ship approaches the wave period (as indicated by a step in the graph of FIG. 2). The applicant has investigated some failures and has determined that the failures appear when the lateral acceleration is about 1 g. Parametric roll resonances can lead to similar or greater levels of acceleration. When the lateral acceleration is sufficiently high, containers may pivot around one corner while the contact at the opposite corner is broken and gaps open.

In general, the dynamics of shipping containers stacked on a cargo ship involves multiple natural periods or frequencies: (i) ship global natural periods or frequencies—roll primarily; (ii) periods or frequencies of wave motions in a seaway; and (iii) natural frequencies of container stacks.

Existing software for calculating lashing capacity usually captures the effects of the ship roll. Wave motions may also be captured in the standard formulas provided by Classification Societies. However, the natural frequencies of container stacks, if taken into account, assume that the contact between the containers in the stack is static and that any container will not pivot around one corner while the contact at the opposite corner is broken and gaps open. The shortcomings of existing software are summarized in the Table below.

Figure 3:
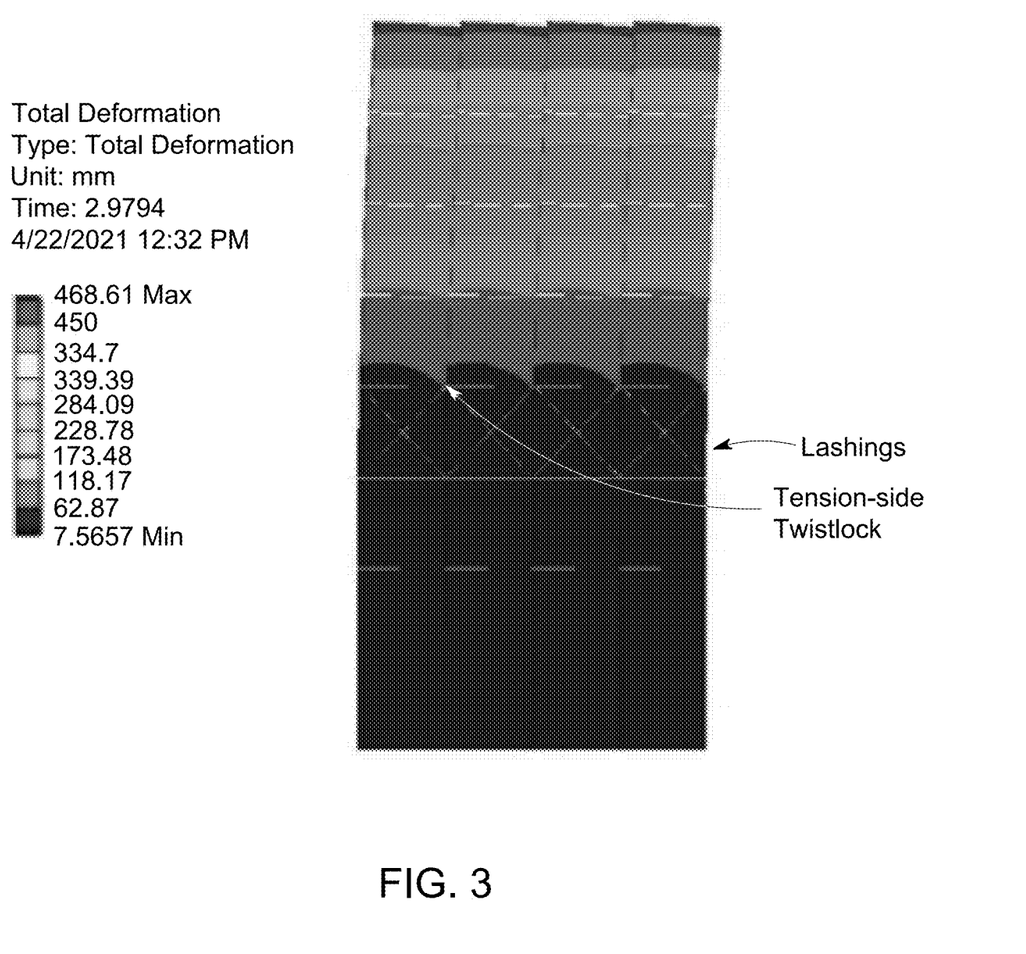
FIG. 3 shows a heat map of simulated deformation in a stack of containers subjected to roll.
Figure 4:
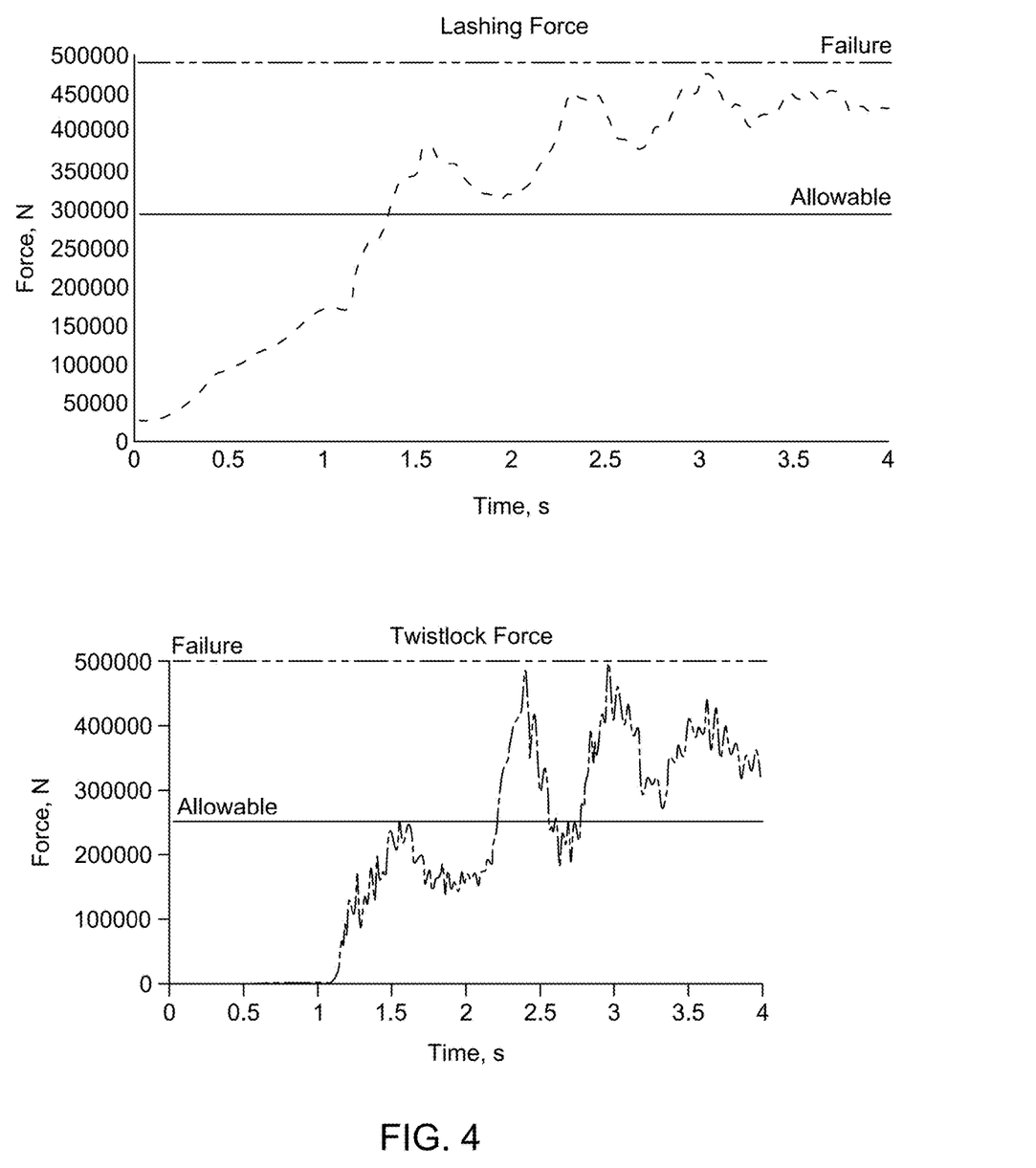
FIG. 4 shows graphs of lashing and twist lock forces as a function of time.

Standard industry loading software assume Quasi-Static response
Loads are calculated using vessel global dynamics
Responses are Static - stack dynamics are assumed to be zero
If connections are rigid, this assumption is valid BUT even small gaps can fundamentally change behavior
Twistlocks have mechanical play (Gaps) - 2 implications:
Increased Dynamic Modal Response - Greater freedom introduces new dynamic modal responses, which increase total loads by 30-40%
Natural frequency dynamic response excited by either 1) Gap stroking out OR 2) Collisions between different stacks
Load sharing between twistlocks and lashings changes unpredictably
Exact gap sizes are important for dynamic performance but per-unit -continued measurement and tracking is impractical
Load can be concentrated either on the twistlock OR the lashing
This effect becomes more important with higher container stacks
Lashings also have mechanical play - can back off due to ship motions
May reduce lashing capacity and increase snap loads if loose The applicant has determined that dynamics may no longer be ignored. The applicant has conducted a root cause assessment of an actual failure. Calculations were performed using C-Lash versions 4.0 and 5.0 with feedback from the original software developer at ABS. A Finite Element Model was created for the purpose of being able to assess various potential solutions. The modeling involved multi-body problems with non-linear connections and contacts. The assessment took into account dynamics to capture effects more fully. FIG. 3 illustrates a snapshot of the deformation of a stack of containers. FIG. 4 illustrates graphs of the tension force in the lashing and the force in a container twist lock as a function of time. FIGS. 3 and 4 show that both lashing and twist lock loads are in the failure range (note that the lashing capacity is calculated as fully engaged, but the lashing can have lower capacity if backed off).

FIGS. 3 and 4 also indicate that both types of failures (lashing and twist lock) may occur at different bays. The applicant believes that in cases of lashing-initiated failure, the following scenario likely occurs: a first lashing fails (calculated at breaking load), second lashing fails (now 200% of breaking load), a bottom twist lock fails (now 500% of breaking load), then the next stack now fails. The applicant believes that in cases of twist lock-initiated failure, the following scenario likely occurs: a first twist lock failure is just above the lashing bridge (tension-side twist lock is calculated at breaking load in a fully intact condition), after initiating failure, stack now leans on next stack, a tension-side twist lock of next stack now fails (now 200% of breaking load).

Therefore, there is a need in the art for methods and systems for monitoring the dynamics of shipping containers stacked on a cargo ship subjected to waves.

BRIEF DESCRIPTION OF THE DRAWINGS

For a more detailed description of the embodiments of the disclosure, reference will now be made to the accompanying drawings, wherein.

DETAILED DESCRIPTION

It is to be understood that the following disclosure describes several exemplary embodiments for implementing different features, structures, or functions of the invention.

Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

A preferred example of a monitoring system is able to both measure the loads in the lashings and rapidly detect the natural frequencies of the stack, identify the major ones and provide alerts for potential overloading. In particular, natural frequencies that occur when containers pivot can be detected.

The monitoring system involves a load pin, which includes a load cell coupled to a board having a processor, wherein the sampling rate is sufficiently high to be able to detect the stack modes of resonance. At least 10 Hz may be required depending on the weights of the containers and the height of the overall stack.

Figure 5:
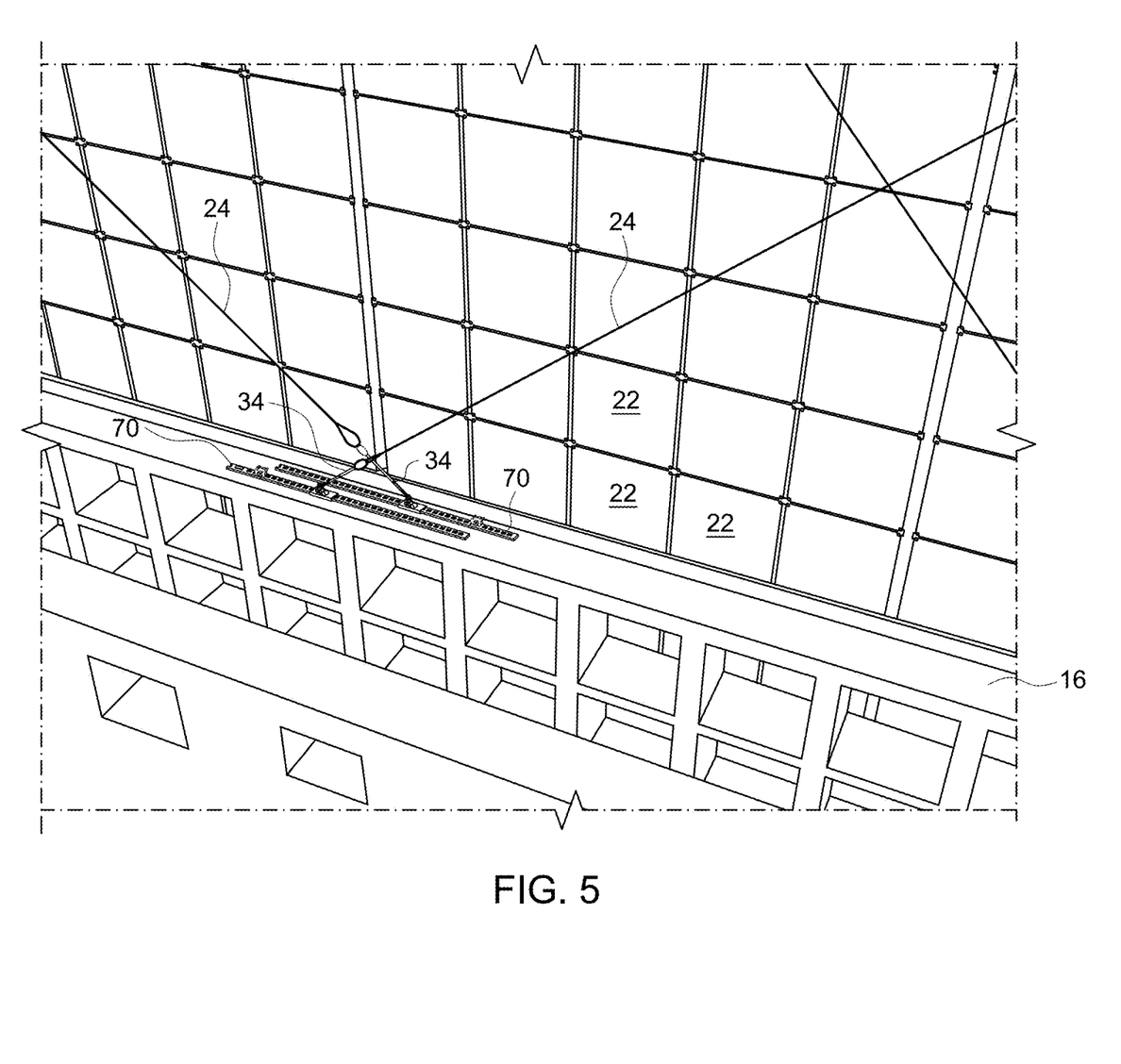
FIG. 5 is a perspective view of a monitoring system for predicting failures to secure shipping containers stacked on a cargo ship.
Figure 6:
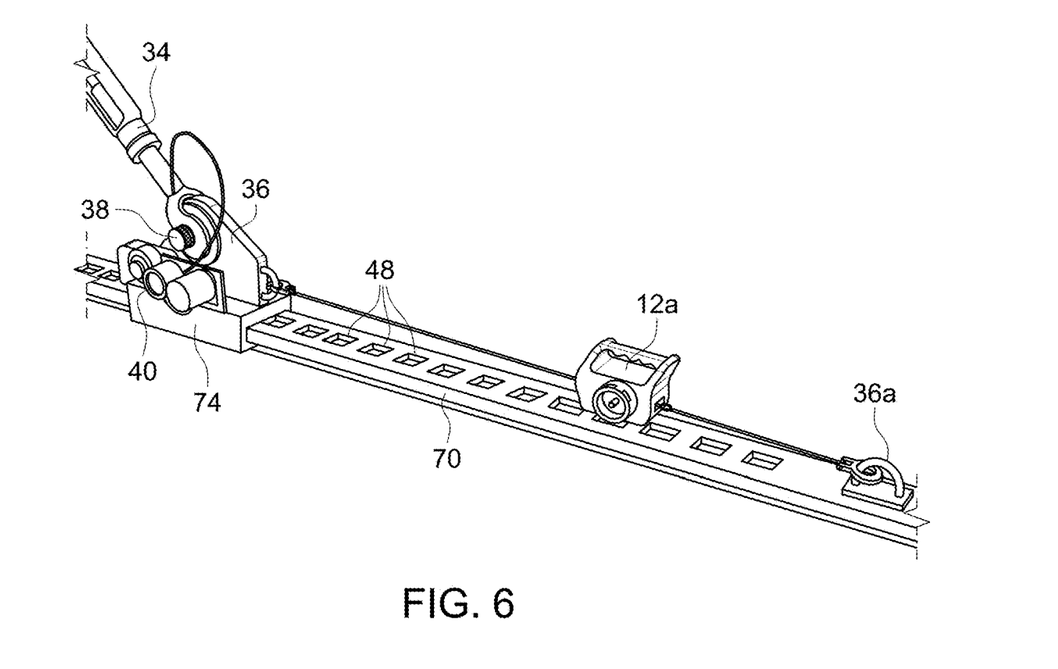
FIG. 6 is a perspective view of a portion of the system shown in FIG. 5.

Such a system is illustrated in FIGS. 5 and 6. The monitoring system, as shown, includes a track 70 adapted to be secured to the lashing bridge 16 or, more generally, to any structure of a cargo ship and even to another container. A clamp 74 is configured to slide on track 70 such that the position of the clamp 74 along track 70 can be adjusted. The clamp 74 can be locked at one of a plurality of discrete positions. There are several ways this can be achieved, and only one example is shown. Optionally, a portable winch 12A is coupled to a foundation formed by track 70 through a pad eye 36a and is configured to adjust the position of the clamp 74 along track 70. The winch 12A is driven by an operator and assists the operator in positioning the clamp 74 in a position where the lashing 24 can be placed under tension. The tension in the lashing 24 can be further adjusted using the turnbuckle 34.

FIGS. 5 and 6 also illustrate a load pin 38 that can be used to monitor the tension in the lashing 24. Measurements performed by the load pin 38 may be transmitted (e.g., broadcasted) to other locations using the Wi-Fi terminal 40, which is fixedly coupled to the cargo ship (e.g., to the lashing bridge 16 of the cargo ship). The housing of the Wi-Fi terminal 40 may also protect an accelerometer and/or gyroscope that can be used to determine the ship's pitch and roll. The measurements performed by the accelerometer and/or gyroscope can also be transmitted (e.g., broadcasted) using the Wi-Fi terminal 40. Communication protocols other than Wi-Fi can alternatively be used.

Figure 7:
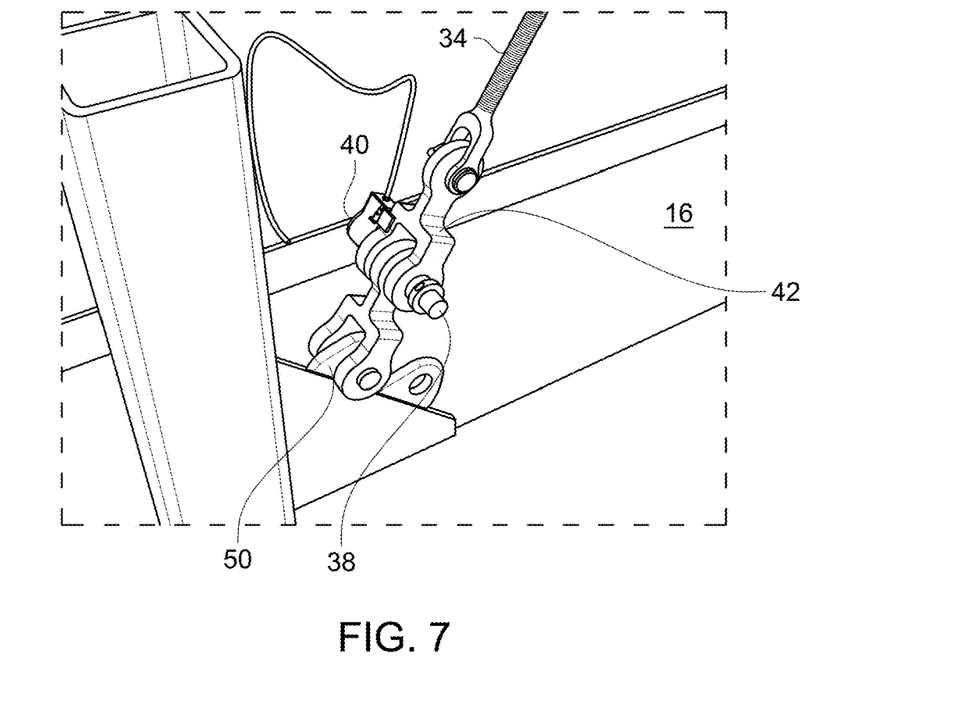
FIG. 7 is a perspective view of a monitoring system for predicting failures to secure shipping containers stacked on a cargo ship.
Figure 8:
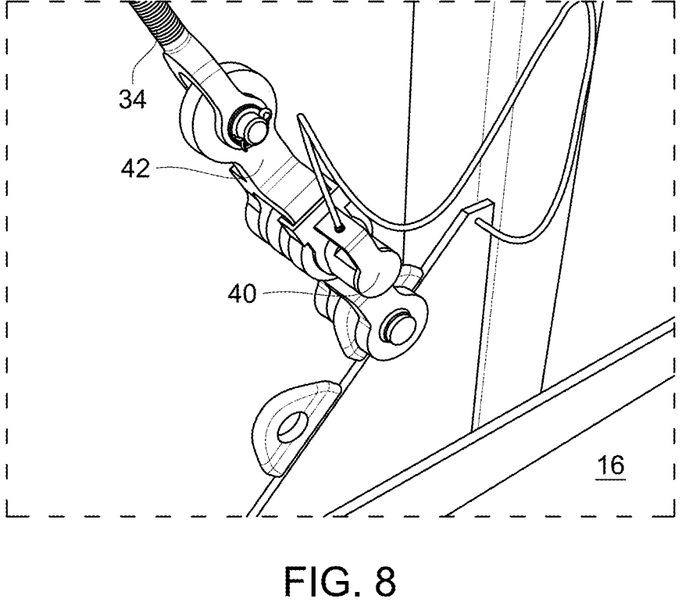
FIG. 8 is another perspective view of the system shown in FIG. 7.

FIGS. 7 and 8 illustrate another example of a monitoring system. In this example, the monitoring system can be interfaced with a standard lashing as well as with a lashing that uses a track as shown in FIGS. 5 and 6. The monitoring system is built by swapping out the passive pin in a turnbuckle to a load pin 38 with the appropriate board/battery/communication system in the terminal 40. An adapter 42 can be used to accommodate ships lashing connections that can vary in pin size.

As shown, the adaptor 42 is able to interface with the existing ship lashing clip 50 if the load pin 38 has a different diameter from the diameter of the pin coupling the turnbuckle 34 to the clip 50. However, if they are the same diameter, the load pin 38 can interface directly with the ship lashing clip 50 and the turnbuckle 34. The adapter 42 includes first and second 2-prong forks. The first 2-prong fork has an end having two holes sized to interface with a pin of the lashing clip 50 and another opposite end having one hole sized to interface with the load pin 38. The second 2-prong fork has an end having two holes sized to interface with the load pin 38 and another opposite end having one hole sized to interface with the turnbuckle 34 and the lashing.

Figure 9:
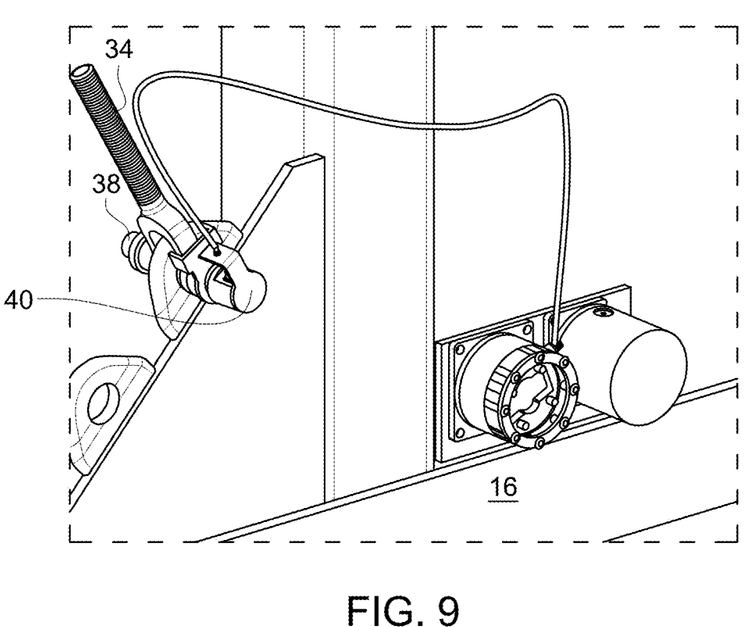
FIG. 9 is a perspective view of a monitoring system for predicting failures to secure shipping containers stacked on a cargo ship.

FIG. 9 illustrates yet another configuration of the monitoring system. The load pin 38 goes through its analog/digital card (or similar) and then is cabled to an external device 40. The external device may or may not have a display. The external device transmits data (raw or processed data, as explained below) to receivers using a long-distance protocol (LORA, BTLE, or similar) and to a computer (e.g., central data processor). Optionally, it is possible that the packaging will be restructured to integrate all the components (e.g., load pin, analog/digital card, processor programmed to perform signal analysis, transmitter) of the monitoring system into a single housing that fits directly to the load pin 38. Also, the lashing, while shown secured to the lashing bridge 16, may alternatively be secured to the deck of the cargo ship.

Figure 10:
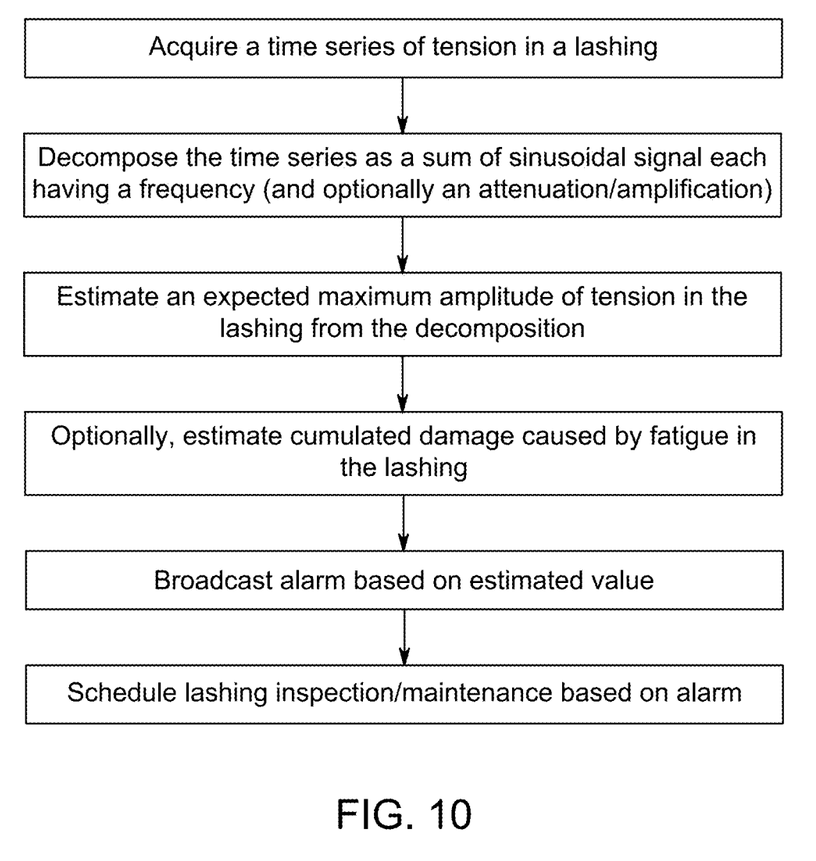
FIG. 10 is a flowchart of a method for predicting failures to secure shipping containers stacked on a cargo ship.

An example method of use of any of the systems previously described is illustrated in FIG. 10.

In reference to FIG. 10, in the first step, the load cell reads in the loads at the sampling rate and then stores the readings into a buffer, which is constantly analyzed for natural frequency identification.

In the second step, the signal is processed using a suitable systems identification algorithm, such as Prony's Method or Systems Identification methods (Auto-Regressive Moving Average, or similar), which can detect the frequencies in the system based on very short time signals. The duration of the time series can be very short—generally just like the 1-2 seconds range. For example, this method will find the appropriate signals in 8-12 data points using a 10 Hz sampling rate, so the duration will be 0.8-1.2 seconds.

This can be useful because the high natural frequency excitations happen quickly and then die out, meaning that any method that looks at a longer time series will be averaging too much and will understate the magnitude of the resonance.

Prony's method, for example, will be able to detect analytically at least N/2 frequencies in a time series that is N samples long. Instead of using this at N/2, a larger matrix using Singular Value Decomposition can be used to be able to reject the least likely frequency components, thereby increasing the reliability of the frequency detection.

At this step, there can still be extraneous frequency components that need to be eliminated further. Using the property that a signal should show the same frequency content forward as when it is in reversed order, the extracted modes from each processing can then be compared. The ones that match are very reliably the actual modes.

The data can then be placed into a matrix in a form that will allow the decomposition of the amplitudes. At this point, the natural frequencies and amplitudes will be known, and these can then be sent back to the control room for further processing.

Note that this method will be detecting the natural roll period and the container stack natural periods but may not accurately define the wave frequency response (which is a low frequency and requires a long sequence of samples to be analyzed). Nevertheless, this method may be sufficient to detect the natural roll period and the container stack natural periods and provide useful alerts for potential overloading.

In the third step, once these magnitudes are calculated, they are combined together to estimate a maximum expected value of the tension in the lashing, given the current dynamics, is left to a variety of methods that are known in the industry.

Alternatively or additionally, in the fourth step, cumulated damage caused by cyclic loads (fatigue) in the lashing can be estimated.

In the fifth step, an alarm is triggered.

If bandwidth (and/or reliability) is a concern, the calculations can be done on the device itself (e.g., by the processor in the board coupled to the load cell). Given the potentially large number of signals that may be received, it may be advantageous to perform all the calculations on the device. Otherwise, all of the data could be sent to a computer (e.g., central data processor) on the bridge, where it will be processed using the described methodology.

In addition to the foregoing, the disclosure also contemplates at least the following embodiments.

Embodiment 1

Embodiment 1 is a monitoring system for predicting failures to secure shipping containers stacked on a cargo ship. The system includes load cells coupled to a lashing that secures shipping containers stacked on a cargo ship.

Each of the load cells comprises a processor programmed to acquire time series of tension in a lashing.

Preferably, the acquisition rate is higher than 10 Hertz (+/−10%).

Preferably, the time series last a duration of 0.8 to 1.2 seconds. However, the time series may last up to 2 seconds.

Preferably, the acquired time series are buffered.

The load cells are configured to transmit (e.g., broadcast) data related to the time series of tension in the lashing to a computer (e.g., central data processor).

Preferably, the computer is in a control room. The transmission may be direct to the control room or indirect through one or more relay stations and then to the control room.

Embodiment 2

Embodiment 2 is a monitoring system as described in embodiment 1 wherein the computer (e.g., central data processor) and/or the processor of each of the load cells is further programmed to decompose the time series into a sum of sinusoidal signals, each having a frequency and an amplitude.

Preferably, the processor is programmed to decompose each of the time series into the sum of sinusoidal signals using Prony's method. However, the processor may be programmed to decompose each time series into the sum of sinusoidal signals using other Systems Identification methods (Auto-Regressive Moving Average, or similar).

Preferably, a new time series, possibly overlapping partially with the previous time series, is analyzed approximately every second.

Embodiment 3

Embodiment 3 is a monitoring system as described in embodiment 2, wherein the data related to the time series of tension in the lashing that are transmitted by the load cells to the computer (e.g., central data processor) include data related to the frequencies and amplitudes of the decomposition.

Embodiment 4

Embodiment 4 is a monitoring system as described in any of embodiments 1 to 3, wherein at least one of the load cells includes a load pin and an adapter. The adapter is configured to connect a clip of the cargo ship to a turnbuckle of the lashing. As such, the same load pin can interface with ships having different clip and/or lashing configurations.

Embodiment 5

Embodiment 5 is a monitoring system as described in embodiment 4, wherein the adapter includes first and second 2-prong forks. The first 2-prong fork has an end having two holes sized to interface with a pin of a lashing clip and another opposite end having one hole sized to interface with a load pin. The second 2-prong fork has an end having two holes sized to interface with the load pin and another opposite end having one hole sized to interface with the lashing.

Embodiment 6

Embodiment 6 is a monitoring system for predicting failures to secure shipping containers stacked on a cargo ship. The system includes accelerometer cells coupled to shipping containers stacked on a cargo ship.

Each of the accelerometer cells comprises a processor programmed to acquire time series of acceleration (e.g., transverse acceleration) of a shipping container.

Preferably, the acquisition rate is higher than 10 Hertz (+/−10%).

Preferably, the time series last a duration of 0.8 to 1.2 seconds. However, the time series may last up to 2 seconds.

Preferably, the acquired time series are buffered.

The accelerometer cells are configured to transmit (e.g., broadcast) data related to the time series of acceleration of the shipping container to a computer (e.g., central data processor).

Preferably, the computer is in a control room. The transmission may be direct to the control room or indirect through one or more relay stations and then to the control room.

Optionally, the system may comprise the load cells described in any of embodiments 1 to 5, and the computer (e.g., central data processor) may receive data from the load cells and the accelerometer cells.

Embodiment 7

Embodiment 7 is a monitoring system as described in embodiment 6, wherein the computer (e.g., central data processor) and/or the processor of each of the accelerometer cells is further programmed to decompose the time series into a sum of sinusoidal signals, each having a frequency and an amplitude.

Preferably, the processor is programmed to decompose each of the time series into the sum of sinusoidal signals using Prony's method. However, the processor may be programmed to decompose each of the time series into the sum of sinusoidal signals using other Systems Identification methods (Auto-Regressive Moving Average, or similar).

Preferably, a new time series, possibly overlapping partially with the previous time series, is analyzed approximately every second.

Embodiment 8

Embodiment 8 is a monitoring system as described in embodiment 7, wherein the data related to the time series of acceleration of the shipping container that are transmitted by the accelerometer cells to the computer (e.g., central data processor) include data related to the frequencies and amplitudes of the decomposition.

Embodiment 9

Embodiment 9 is a monitoring system as described in any of embodiments 6 to 8, wherein the accelerometer cells are coupled to shipping containers located at the top of the stack of containers.

Embodiment 10

Embodiment 10 is a monitoring system as described in any of embodiments 1 to 9, wherein the transmission (e.g., broadcast) is performed through a relay station that is located at the top of a stack of containers.

Preferably, the transmission utilizes a long-distance protocol such as available from the LoRa Alliance® or Bluetooth-Low Energy (BTLE). However, other long-distance protocols may be used instead.

Embodiment 11

Embodiment 11 is a monitoring system as described in any of embodiments 1 to 10, further comprising an inclinometer cell coupled to the cargo ship (e.g., the bridge of the cargo ship).

Preferably, the inclinometer includes a gyroscope. However, a tri-axial accelerometer may also be used. For example, the inclinometer may be located in the control room Because the inclinometer is not sensitive to the dynamics of the stacks of containers, the acquisition rate may be lower than 10 Hertz (+/−10%), and the time series may last more than 2 seconds.

The inclinometer cell is configured to communicate data related to a time series of roll angles of the cargo ship to the computer.

Embodiment 12

Embodiment 12 is a monitoring system as described in embodiment 11 wherein either the inclinometer cell includes a processor programmed to acquire the time series of roll angles of the cargo ship, and the processor may be programmed to decompose the time series of the roll into a sum of sinusoidal signals, each having a frequency and an amplitude, or the computer (e.g., central data processor) may be programmed to decompose the time series of the roll into a sum of sinusoidal signals, each having a frequency and an amplitude.

If frequencies and amplitudes of the decomposition have been calculated by the processor included in the inclinometer cell, the data communicated by the inclinometer cell to the computer (e.g., central data processor) include data related to the frequencies and amplitudes of the decomposition.

Embodiment 13

Embodiment 13 is a monitoring system as described in any of embodiments 1 to 12, wherein the processor in each cell, but preferably the computer (e.g., central data processor), is programmed to identify the sinusoidal signals caused by resonances in shipping container stacks based on the frequencies of the sinusoidal signals. Frequency and amplitude data from the load cells and/or the accelerometer cells can be used.

For example, the sinusoidal signals having a frequency higher than 0.5 Hz (or a period shorter than 2 seconds) may be identified as being caused by the resonances in shipping container stacks. Alternatively, a frequency threshold may be computed by simulations of the stacks of shipping containers using the Finite Element methods, taking into account dynamics effects in the container stacks and the opening/closure of the connections between the containers.

Optionally, data from the inclinometer cell can be used to rule out the frequencies of sinusoidal signals not caused by resonances in shipping container stacks.

Embodiment 14

Embodiment 14 is a monitoring system as described in embodiment 13, wherein the computer (e.g., central data processor) is programmed to trigger an alarm if an energy (e.g., a magnitude squared) or amplitude (e.g., a magnitude) of at least some of the sinusoidal signals caused by resonances in shipping container stacks exceeds a predetermined value.

Embodiment 15

Embodiment 15 is a monitoring system as described in any of embodiments 1 to 14, wherein the processor in each cell, but preferably the computer (e.g., central data processor), is programmed to identify the sinusoidal signals caused by the roll of the cargo ship based on the frequencies of the sinusoidal signals. Frequency and amplitude data from the load cells, the accelerometer cells, and/or the inclinometer cell can be used.

For example, the sinusoidal signals having a frequency lower than 0.1 Hz (or a period longer than 10 seconds) may be identified as being caused by the roll of the cargo ship. Alternatively, a frequency threshold may be computed by simulations of the cargo ship using the known methods to estimate the parametric roll resonance.

Embodiment 16

Embodiment 16 is a monitoring system as described in any of embodiments 1 to 15, wherein the processor in each cell, but preferably the computer (e.g., central data processor), is programmed to run an algorithm that extrapolates an energy (e.g., a magnitude squared) or amplitude (e.g., a magnitude) of at least some of the sinusoidal signals.

The computer (e.g., central data processor) can receive data related to the frequencies and amplitudes from a plurality of cells approximately every second. Preferably, after reception from each of the plurality of cells, the computer (e.g., central data processor) can identify, based on the frequencies of the sinusoidal signals, one sinusoidal signal caused by the roll of the cargo ship. However, the computer (e.g., central data processor) can additionally or alternatively identify one sinusoidal signal caused by the resonances in shipping container stacks.

For each of the plurality of cells, the computer (e.g., central data processor) can store the energy or amplitude of the one identified signal, generating a series representing at approximately every second the energy or amplitude of the roll angle of the cargo ship, the acceleration of a container, and/or the tension in a lashing. When the series is sufficiently long, for example, approximately 5 samples (+/-one sample), the computer (e.g., central data processor) can fit a function to the series.

For example, the function may be selected to have an asymptote, such as a concave power or exponential function. Alternatively, the function may be selected as a linear or polynomial.

The fitted function is used for the extrapolation.

Embodiment 17

Embodiment 17 is a monitoring system as described in embodiment 16, wherein the computer (e.g., central data processor) is programmed to generate a maximum value of the roll angle of the cargo ship, the acceleration of a container, and/or the tension in a lashing based on an extrapolation of the energy or amplitude and to trigger an alarm if the maximum value exceeds a predetermined value.

For example, the calculated value of the asymptote may represent the extrapolation. Alternatively, the calculated value of the function at a future time may represent the extrapolation.

Embodiment 18

Embodiment 18 is a monitoring system as described in any of embodiments 1 to 17, wherein a cumulated damage caused by fatigue in one or more lashings or twist locks is estimated using known mechanical properties of the one or more lashings.

For example, the computer (e.g., central data processor) can estimate the cumulated damage from frequency and amplitude data from the load cells. Alternatively, the processor in each of the load cells can estimate the cumulated damage from the time series of tension in the lashing, and transmit (e.g., broadcast) the cumulated damage to the computer.

What is claimed is:

1. A system including load cells coupled to a lashing that secures shipping containers stacked on a cargo ship,
the load cells having a processor programmed to:
acquire a time series of tension in a lashing; and
decompose the time series into a sum of sinusoidal signals, each having a frequency and an amplitude;
wherein the load cells are configured to transmit data related to the frequencies and amplitudes to a computer.

2. The system of claim 1 wherein at least one of the load cells includes a load pin and an adapter configured to connect a clip of the cargo ship to a turnbuckle of the lashing.

3. The system of claim 2 wherein the adapter includes first and second 2-prong forks,
wherein the first 2-prong fork has an end having two holes sized to interface with a pin of a lashing clip and another opposite end having one hole sized to interface with a load pin, and
wherein the second 2-prong fork has an end having two holes sized to interface with the load pin and another opposite end having one hole sized to interface with the lashing.

4. The system of claim 1 further comprising accelerometer cells coupled to shipping containers stacked on a cargo ship,
the accelerometer cells having a processor programmed to:
acquire a time series of acceleration of a shipping container; and
decompose the time series into a sum of sinusoidal signals, each having a frequency and an amplitude;
wherein the accelerometer cells are configured to transmit data related to the frequencies and amplitudes to the computer.

5. The system of claim 1 wherein the transmitting is performed through a relay station that is located at a top of a stack of containers.

6. The system of claim 1 further comprising an inclinometer cell coupled to the cargo ship,
the inclinometer cell having a processor programmed to:
acquire a time series of roll angle of the cargo ship; and
decompose the time series of the roll into a sum of sinusoidal signals, each having a frequency and an amplitude.

7. The system of claim 1, wherein the computer or the processor in the cells is programmed to identify the sinusoidal signals caused by resonances in shipping container stacks based on the frequencies of the sinusoidal signals.

8. The system of claim 1, wherein the computer or the processor in the cells is programmed to identify the sinusoidal signals caused by roll of the cargo ship based on the frequencies of the sinusoidal signals.

9. The system of claim 1 wherein the computer or the processor in the cells is programmed to run an algorithm that extrapolates an energy or amplitude of at least some of the sinusoidal signals.

10. The system of claim 1 wherein the computer or the processor in the cells is programmed to generate a maximum value of the tension in the lashing based on an extrapolation of the energy or amplitude and to trigger an alarm if the maximum value of the tension in the lashing exceeds a predetermined value.

11. A system including accelerometer cells coupled to a shipping container of a stack of shipping containers on a cargo ship,
the accelerometer cells having a processor programmed to
acquire a time series of acceleration of a shipping container; and
decompose the time series into a sum of sinusoidal signals, each having a frequency and an amplitude;
wherein the accelerometer cells are configured to transmit data related to the frequencies and amplitudes to a computer.

12. The system of claim 11 wherein the accelerometer cells are coupled to shipping containers located at the top of the stack of containers.

13. The system of claim 11 further comprising an inclinometer cell coupled to the cargo ship,
the inclinometer cell having a processor programmed to:

acquire a time series of roll angle of the cargo ship; and decompose the time series of the roll into a sum of sinusoidal signals, each having a frequency and an amplitude.

14. The system of claim 11, wherein the computer is programmed to identify the sinusoidal signals caused by resonances in shipping container stacks based on the frequencies of the sinusoidal signals.

15. The system of claim 11, wherein the computer is programmed to identify sinusoidal signals caused by roll of the cargo ship based on the frequencies of the sinusoidal signals and optionally run an algorithm that extrapolates an energy or amplitude of the sinusoidal signals caused by the roll of the cargo ship.

16. A system including:

load cells coupled to a lashing that secures shipping containers stacked on a cargo ship, the load cells having a processor programmed to acquire a time series of tension in a lashing, wherein the load cells are configured to transmit data related to the time series of tension in the lashing to a computer that is in a control room;

wherein the computer is programmed to decompose the time series of tension in the lashing into a sum of sinusoidal signals, each having a frequency and an amplitude.

17. The system of claim 16 further including:

accelerometer cells coupled to shipping containers located at a top of a stack of containers, the accelerometer cells having a processor programmed to acquire a time series of acceleration of a shipping container, wherein the accelerometer cells are configured to transmit time series of acceleration of the shipping container to the computer;

wherein the computer is programmed to decompose the time series of acceleration of the shipping container into a sum of sinusoidal signals, each having a frequency and an amplitude.

18. The system of claim 17 further including:

an inclinometer cell coupled to the cargo ship, the computer being programmed to acquire a time series of roll angle of the cargo ship;

wherein the computer is programmed to decompose the time series of roll angle of the cargo ship into a sum of sinusoidal signals, each having a frequency and an amplitude.

* * * * *